(12) United States Patent
Mildner

(10) Patent No.: US 8,870,274 B2
(45) Date of Patent: Oct. 28, 2014

(54) SIDE MEMBER FOR A REAR FRAME OF A VEHICLE BODY

(71) Applicant: GM Global Technology Operations LLC, Detroit, MI (US)

(72) Inventor: Udo Mildner, Limburg (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/769,445

(22) Filed: Feb. 18, 2013

(65) Prior Publication Data

US 2013/0221709 A1 Aug. 29, 2013

(30) Foreign Application Priority Data

Feb. 28, 2012 (DE) .......................... 10 2012 004 001

(51) Int. Cl.
*B62D 21/02* (2006.01)
*B62D 25/08* (2006.01)
*B62D 25/02* (2006.01)

(52) U.S. Cl.
CPC .............. *B62D 21/02* (2013.01); *B62D 25/088* (2013.01); *B62D 25/02* (2013.01); *B62D 25/087* (2013.01)
USPC ................................. 296/203.04; 296/187.11

(58) Field of Classification Search
CPC ...... B62D 21/152; B62D 29/00; B62D 29/07; B62D 29/008; B62D 21/02
USPC .............. 296/187.1, 193.08, 203.04, 203.041
See application file for complete search history.

(56) References Cited

U.S. PATENT DOCUMENTS

| 4,679,820 | A | 7/1987 | Srock et al. |
| 7,997,618 | B2 * | 8/2011 | Hartmann et al. ............ 280/785 |
| 8,177,291 | B2 * | 5/2012 | Gosolits et al. .......... 296/193.05 |
| 8,474,870 | B1 * | 7/2013 | Ng et al. ........................ 280/785 |
| 2003/0102697 | A1 * | 6/2003 | Yakata et al. .................. 296/209 |
| 2006/0202519 | A1 * | 9/2006 | Latimer et al. ........... 296/203.04 |
| 2010/0148538 | A1 * | 6/2010 | Neumann et al. ........ 296/203.04 |
| 2011/0101641 | A1 * | 5/2011 | Mildner et al. ........ 280/124.164 |
| 2012/0169089 | A1 * | 7/2012 | Rawlinson et al. ...... 296/193.08 |

FOREIGN PATENT DOCUMENTS

| DE | 4104894 A1 | 9/1991 |
| DE | 19637243 A1 | 3/1998 |
| DE | 19946558 A1 | 4/2001 |

(Continued)

OTHER PUBLICATIONS

Machine Translation of DE102007006722A1, printed from the EPO website, Feb. 20, 2014.*

(Continued)

*Primary Examiner* — Jason Morrow
(74) *Attorney, Agent, or Firm* — Ingrassia Fisher & Lorenz, P.C.

(57) ABSTRACT

The present invention relates to a side member in shell design for a rear frame of a self-supporting body of a motor vehicle, having a lower shell and an upper shell which are connected to each other in a fixed manner and at least in portions for a closed hollow member, wherein the lower shell is assembled from three shell parts, which in extension direction of the side member are arranged one after the other, wherein a middle shell part arranged between the two other shell parts at least in portions is formed as metal cast component, in particular steel cast component.

28 Claims, 11 Drawing Sheets

(56) References Cited

FOREIGN PATENT DOCUMENTS

| DE | 10352078 | A1 | 6/2005 |
| DE | 102005039463 | A1 | 2/2007 |
| DE | 102005039464 | A1 | 2/2007 |
| DE | 102006017225 | A1 | 10/2007 |
| DE | 102007006722 | A1 | 12/2008 |

OTHER PUBLICATIONS

German Patent Office, German Search Report for Application No. 102012004 001.6, dated Sep. 10, 2012.

* cited by examiner

SIDE MEMBER FOR A REAR FRAME OF A VEHICLE BODY

CROSS-REFERENCE TO RELATED APPLICATION

This application claims priority to German Patent Application No. 10 2012 004 001.6, filed Feb. 28, 2012, which is incorporated herein by reference in its entirety.

TECHNICAL FIELD

The technical field relates to automotive engineering and to a shell designed for a rear frame of a self-supporting body of a motor vehicle, in particular, of a passenger car.

BACKGROUND

As a rule, modern motor vehicles are provided with a self-supporting body, which, compared with a body mounted on a frame, makes possible a weight and costs reduction. In the self-supporting body, the components in their entirety absorb the introduced forces, wherein the stiffness of the body is achieved through hollow profiles and a compact outer sheet metal skin. Usually, the hollow profiles are produced from sheet steel, wherein for the purpose of the weight reduction, light metal materials are also employed.

In a typical design, self-supporting bodies comprise an underbody closing off the passenger cell towards the bottom, which is connected to the vehicle roof via vertical braces (pillars). In the region of the underbody, two side sills running in longitudinal direction and a center tunnel extending along the center longitudinal axis are provided, which are connected to one another by cross members. The center tunnel extends from a front wall separating the front body structure from the passenger cell to the rear as far as to the heel plate, which creates a transition between the floor panels of the passenger cell and the floor panels in the region of the trunk located higher up. The body components between the two side sills are mostly called "floor assembly".

On the front end of the floor assembly, a frame-like structure ("front frame") is located, which is assembled from load-bearing profile parts and serves for the stiffening of the front body structure. Exactly such a frame-like structure ("rear frame") is located to the back of the floor assembly and serves for the stiffening of the rear body structure located behind the passenger cell. Both front as well as rear frames each have two side members extending in vehicle longitudinal direction, which are arranged on both sides of the center longitudinal axis of the vehicle and are rigidly connected to one another via cross members. In the overall construction, the side members are connected to the two side sills and the floor assembly, as a result of which a front and rear crash load path respectively is formed, so that the forces that occur during a vehicle collision can be introduced into the underbody and in particular into the side sill structure.

Before the background of increasingly more stringent legal regulations regarding the pollutant output of motor vehicles, it is desirable to make the vehicles as light as possible in order to reduce the overall fuel consumption. On the other hand, the body has to be stiff enough so that it is pushed in as little as possible for protecting the vehicle occupants in the event of a collision. In this regard it is desirable to achieve as high as possible a twisting or torsional stiffness of the body with as low a vehicle weight as possible. In addition, the fatigue behavior of the body is to satisfy the high requirements that are made on the running performance of modern motor vehicles. A further important aspect is the possibility of producing the body in series production with preferably low production and material costs.

In contrast with this, at least one object herein consists in advantageously further developing the bodies of self-supporting bodies of motor vehicles known in the prior art. In addition, other objects, desirable features and characteristics will become apparent from the subsequent summary and detailed description, and the appended claims, taken in conjunction with the accompanying drawings and this background.

SUMMARY

According to an exemplary embodiment, a side member for a rear frame of a self-supporting body of a motor vehicle, in particular of a passenger car, is provided. In the installed state, the side member extends in vehicle longitudinal direction so that the extension direction of the side member corresponds to the vehicle longitudinal direction.

According to an embodiment, the side member is constructed in shell configuration and consists of a first member shell or lower shell and a second member shell or upper shell, which are connected to one another in a fixed manner and, at least over a longitudinal portion, form a closed hollow member. Corresponding to the installation position, the terms lower and upper shell are used here and further on, wherein it is to be understood that the non-installed side member can be oriented in any way.

The lower shell is assembled from three shell parts that are connected to one another in a fixed manner, which in vehicle longitudinal direction or extension direction of the side member are arranged in a row or one after the other, so that the lower shell is assembled from a middle shell part and two further shell parts, which are located on both sides of the middle shell part. Based on the installation position, a front-end or front shell part is located in front of the middle shell part and a rear-end or rear shell part behind the middle shell part. In contrast with the two other shell parts, the middle shell part is designed as cast metal component, in particular, cast steel component.

This makes possible producing a side member with a high stiffness adapted to the respective requirements with particularly low member weight at the same time. Through the construction of the lower shell from three shell parts, the stiffness and material characteristics of each shell part can be specifically adapted to the respective requirements, as a result of which weight, production and material costs can be saved. In the series production, the side member can be produced simply and cost-effectively.

The middle shell part is cast from a metal material, for example an iron metal material, for example, steel. Alternatively, it can be cast from a light metal material, for example aluminum or an aluminum alloy. In an embodiment, the middle shell part of the lower shell produced by the casting method is designed as thin cast component, as a result of which a particularly low member weight can be realized. Advantageously, the middle shell part to this end has a maximum wall thickness of about 2.5 mm at any point, which in particular is in the range from about 1.5 mm to about 2.5 mm. As a result, a sturdy shell part can be produced with a particularly high stiffness and at the same time particularly low weight at low material costs.

By producing the middle shell part according to the casting method one or a plurality of connecting regions in the shell part can be cast in one piece for connecting non-body vehicle parts in integrated form. The connecting regions are thus produced even through casting the middle shell part, so that a separate production and assembly on the shell part is not required. Advantageously, this relates to connecting regions for connecting shock absorbers, axle spring and/or axle swingarm of a wheel suspension for a vehicle wheel. It is true, in principle, that the greater the integration density for connecting non-body vehicle parts in the middle shell part, the more vehicle parts can be saved in order to reduce the assembly costs. In addition, the assembly is simplified in particular with respect to unavoidable assembly tolerances.

In an embodiment, with a configuration of the side member, in which the middle shell part of the lower shell comprises a connecting region for connecting an axle swingarm, this connecting region is configured as box-shaped hollow profile, as a result of which it can be achieved that this connecting region has a particularly high stiffness. According to the casting method, such a box-shaped hollow profile can be produced simply and cost-effectively.

In the side member according to an embodiment, the lower shell is assembled from three separate shell parts, wherein the middle shell part is configured as a cast component. The two other shell parts of the lower shell are produced by a production method that is different from the casting method, so that the shell parts of the lower shell are produced by at least two, in particular three production methods that are different from one another.

With a configuration of the side member, the front shell part is configured as a deep-drawn component. Preferentially, the front shell part consists of a metal material having a yield strength in the range from about 600 to about 800 MPa. Advantageously, the front shell part consists of an iron metal material, for example steel. Alternatively, it can also consist of a light metal material, for example aluminum or an aluminum alloy.

The term "yield strength" describes a material characteristic (tensile strength) through a material characteristic that is well known to the person skilled in the art and specifically designates that tension up to which the material on tensile loading does not show any physical plastic deformation. When the yield strength is exceeded, the material on termination of the loading, no longer returns to its original form. The yield strength can be determined through a standardized tensile test, wherein a specimen defined cross-sectional area is elongated to break and the force on the specimen and the change in length are continuously measured during the test. A standardized tensile test for determining the yield strength or tensile strength for metals is described for example in the standard ENISO 6892. With a further configuration of the side member, which advantageously can be combined with the above configuration of the front shell part as deep-drawn component, the rear shell part is configured as a roll formed component. In an embodiment, the rear shell part consists of a metal material with a yield strength of more than 1,000 MPa. In an embodiment, the rear shell part consists of an iron metal material, for example, steel.

The different shell parts of the lower shell can thus be produced through three different production methods, wherein the respective metal material employed can be specifically adapted to the stiffness and sturdiness requirements in the side member. In addition, the employed production method can be selected with respect to a simple and cost-effective production of the shell parts. For the practical application, it is therefore sufficient to produce the front shell part from a material of comparatively low quality having a relatively low strength (yield strength in the range from about 600 to about 800 MPa) as a result of which material costs can be saved. On the other hand, the rear shell part can be produced from a material of comparatively high quality with a relatively high strength (yield strength above about 1,000 MPa), in order to take into account the higher loads that occur in practice. In this way, a side member having a high stiffness with low member weight and low production costs can be produced. In conjunction with the possibility of providing a plurality of integrated connecting regions in the middle shell part, the side member can be produced in a particularly simple and cost-effective manner, wherein the effect of the weight reduction can be improved further still through the configuration as thin cast component.

In the side member according to an embodiment, the upper shell is preferentially configured as a one-piece deep-drawn component. Through this measure, the upper shell can be simply and cost-effectively produced in series production. Preferentially, the upper shell consists of a hot-formable metal material with a yield strength of more than about 1200 MPa in order to reliably and safely withstand the loads that occur in practice. In an embodiment, the upper shell consists of an iron metal material, for example, steel. The shaping of the side member in shell configuration makes possible adapting the upper shell specifically to the requirements that occur in practice.

In another embodiment, the upper shell comprises a connecting region for connecting a vehicle seat, which for example is provided with a horizontal connecting surface. The connecting region for example can be produced by pressing a protrusion into the upper shell. However, it is also conceivable to provide a separate insert part for this purpose, which is inserted into a recess of the upper shell and connected to the latter in a fixed manner.

In the case of an alternative configuration of the upper shell, in which the upper shell comprises an insert part for connecting a vehicle seat, the upper shell is assembled from two shell parts, which in extension direction of the side member are arranged one after the other. Here, a front shell part of the upper shell that is on the front side in the installed state comprises the insert part and is configured as deep-drawn component in particular from a metal material having a yield strength of more than about 1,200 MPa. In addition, a rear shell part of the upper shell which is on the rear side in the installed state is configured in particular from a metal material having a yield strength of more than about 1,000 MPa. The two-piece construction of the upper shell makes possible an adaptation of the material characteristics of the two shell parts to the loads that occur in practice, so that material costs can be saved.

In the case of a further configuration of the side member, a stiffening profile is attached to a lower side of the front shell part of the lower shell, which for engagement of at least one tool during the assembly of the vehicle body comprises at least one or a plurality of holes. Through the stiffening profile, a simple engagement of assembly tools in the series production is made possible, so that production-related advantages are obtained. On the other hand, an improvement of the stiffness characteristics of the side member can be achieved.

In another embodiment, a rear frame of a motor vehicle having a self-supporting body, in which on both sides of a center longitudinal axis, a side member each configured as described above is provided.

In a further embodiment, a motor vehicle, in particular to a passenger car, having a self-supporting body with a rear frame is provided. On both sides of a center longitudinal axis of the rear frame a side member each configured as described above is arranged in the rear frame.

It is to be understood that the different configurations contemplated herein can be present individually or in any combinations. In particular, the features mentioned above and still to be explained in the following cannot only be employed in the stated combinations but also in other combinations or by themselves without leaving the scope contemplated herein.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the various embodiments or the application and uses thereof. Furthermore, there is no intention to be bound by any theory presented in the preceding background or the following detailed description.

Position and direction details made in the following relate to the orientation of the side member or its components which are schematically shown in the Figures. In the Figures, directions related to the motor vehicle are stated with x, y, z in the usual notation, wherein the x-direction corresponds to the vehicle longitudinal direction, the y-direction to the vehicle transverse direction and the z-direction to the vehicle vertical direction. The driving direction corresponds to the negative x-direction (−x) and is indicated in the perspective representations by an arrow.

Figure 1:
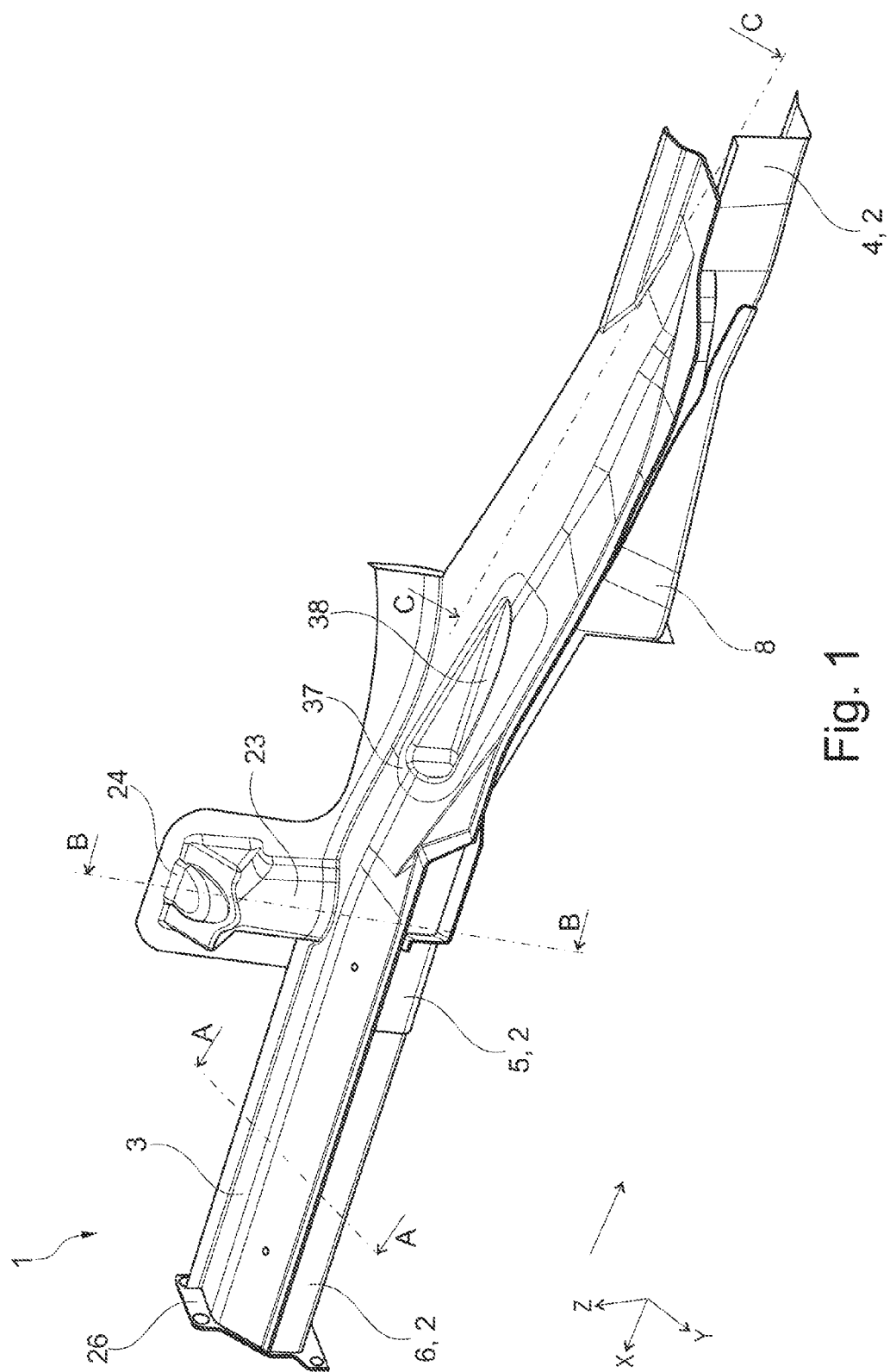
FIG. 1 is a schematic perspective representation of a side member for a rear frame of a vehicle body in accordance with an exemplary embodiment.

In FIG. 1, in an exemplary embodiment, the side member oblong or elongated shape of a rear frame which is not represented further designated altogether with the reference number 1 is shown as part of a self-supporting body of a passenger motor vehicle in a schematic perspective view in a view obliquely from the front. In installation position, the side member 1 extends in longitudinal direction (x) of the motor vehicle. Based on the driving direction (−x) of the motor vehicle, this relates to the left side member 1 of the rear frame, wherein the rear frame on both sides of a center longitudinal axis of the motor vehicle comprises a side member 1 each. The two side members 1 are part of a crash load path for absorbing forces that are introduced into the vehicle at the rear end in the event of a collision. The fundamental construction of the frame structure of a self-supporting body was already described in detail at the outset and is known to the person skilled in the art, for example from series vehicles of the type "Opel Meriva" or "Opel Zafira", so that it is not necessary to discuss this in more detail.

The side member 1 is produced in shell design and comprises a lower part shell or lower shell 2 and an upper part shell or upper shell 3, which are connected to each other in a fixed manner and jointly form a closed hollow member over a longitudinal portion. An exact description of the construction of the side member 1, for the purpose of which the two part shells are described separately, will follow.

Figure 2:
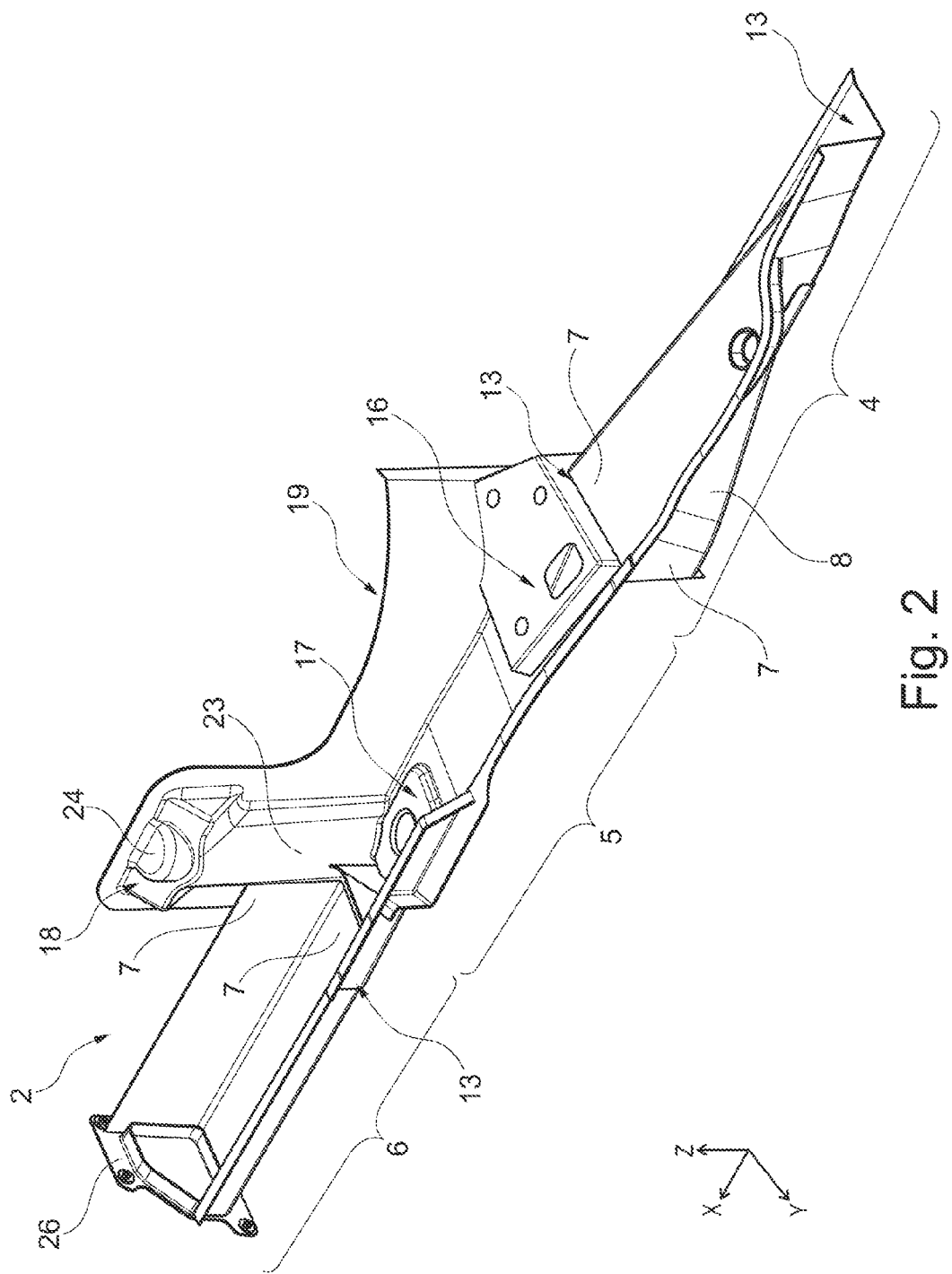
FIG. 2 is a schematic perspective representation of the lower shell of the side member from FIG. 1.

Initially considering FIG. 2, the lower shell 2 is illustrated by means of a schematic perspective representation. The representation corresponds to a view from the top front.

Accordingly, the lower shell 2 is assembled from three individual parts of different metal materials which are connected to one another in a fixed manner. Thus, the lower shell 2 based on the driving direction (−x) of the motor vehicle, comprises a front shell part 4, a middle shell part 5 and a rear shell part 6, each of which have an oblong shape and in vehicle longitudinal direction (x) are arranged in series or one after the other. At their face ends 15, the shell parts 4-6 are connected to one another in a fixed manner through a plurality of fastening points 7 which are arranged evenly distributed. The connection can be effected through a conventional fastening technique such as welding, riveting, clinching or gluing.

Figure 3:
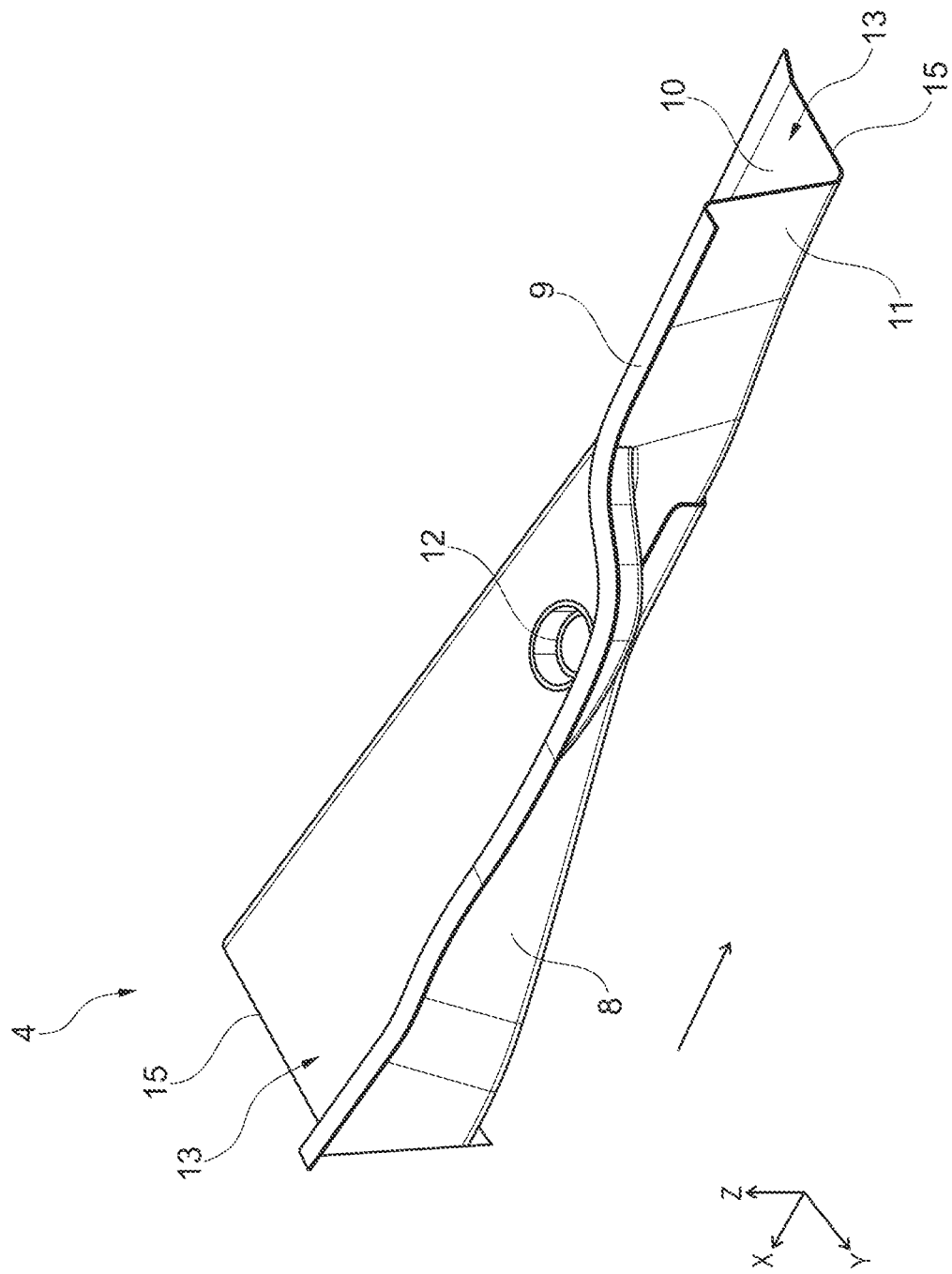
FIGS. 3-4 are schematic perspective representations of the front shell part of the lower shell from FIG. 2.
Figure 4:
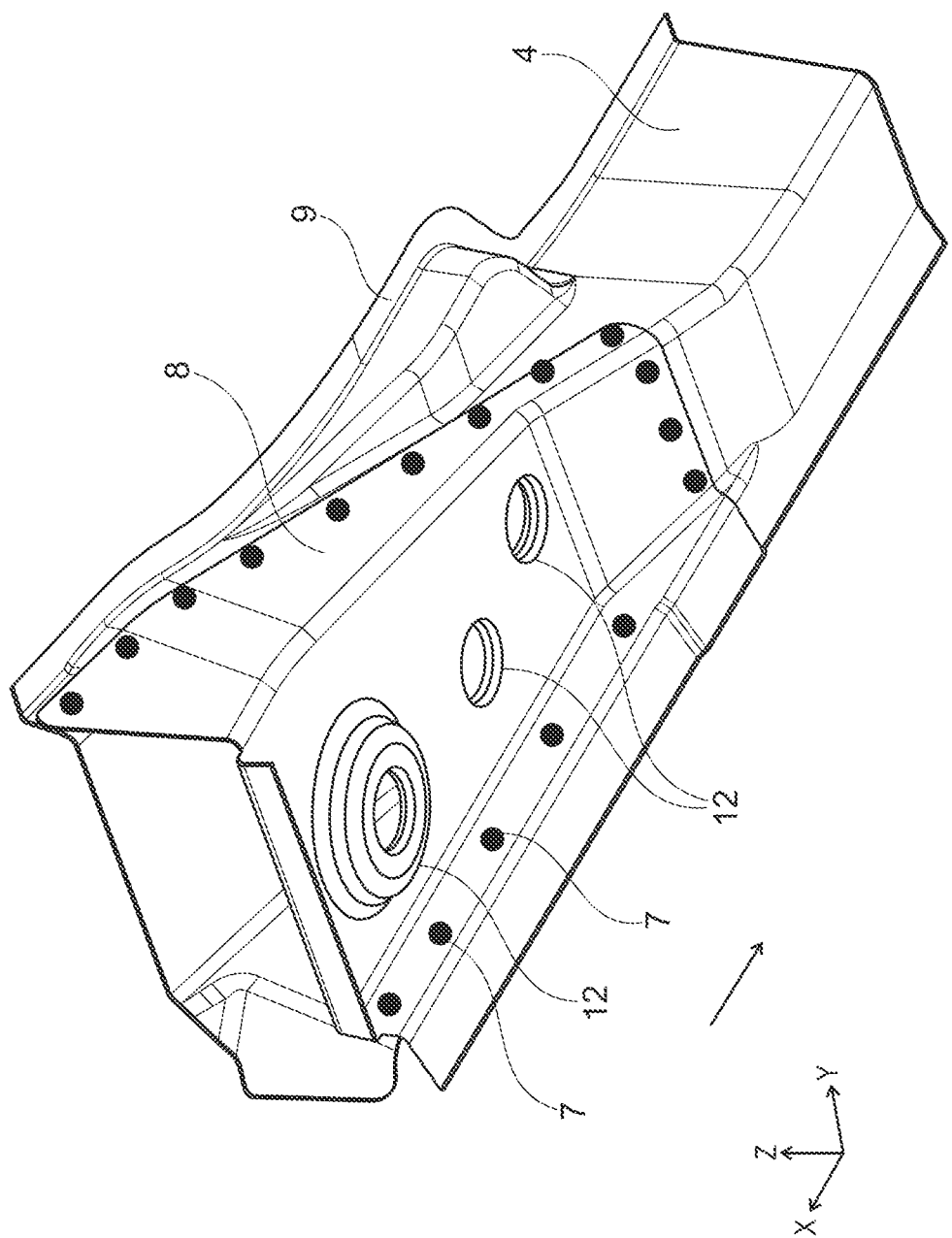

A description of the different shell parts 4-6 of the lower shell 2 follows. Initially looking at the FIGS. 3 and 4, the front shell part 4 is represented enlarged in schematic perspective representations in a view from the top front (FIG. 3) and bottom rear (FIG. 4).

Accordingly, the front shell part 4 has an L-shape and comprises a horizontal floor portion 10, which merges into an inner wall portion 11 obliquely extending to the top. A folded-over edge of the inner wall portion 11 forms a fastening flange, in the following called "lower shell flange 9", which serves for fastening the upper shell 3. On its two face ends 15, the front shell part 4 comprises a first connecting region 13 each, wherein, based on the driving direction (−x), the front first connecting region serves for connecting the front shell part 4 to the part of the vehicle underbody, in particular the side sill (not shown) located in front of the rear frame. The rear first connecting region 13 serves for connecting the front shell part 4 to the middle shell part 5.

In an embodiment, the front shell part 4 consists of sheet steel of lesser quality, which has a yield strength in the range of from about 600 to about 800 MPa and is produced as one-piece deep-drawn component according to the deep-drawing method. The wall thickness of the front shell part 4 is for example in the range from about 1.0 mm to about 1.5 mm.

As is evident in FIG. 4, a further profile component, in the following called stiffening profile 8, is fastened to the lower side of the floor portion 10 of the front shell part 4 through a plurality of fastening points 7. The connection can be effected through a conventional fastening technique such as welding, riveting, clinching or gluing. The stiffening profile 8 has an angular structure in L-shape and comprises a plurality of main mounting holes 12, which serve for the engagement of a tool during the production pass. In addition, the stiffening profile 8 serves for stiffening the side member 1 in the region of the front shell part 4.

In another embodiment, the stiffening profile 8 consists of sheet steel having a yield strength in the range from about 600 to about 800 MPa and is produced as a one-piece deep-drawn component according to the deep-drawing method. The wall thickness of the stiffening profile 8 is in the range, for example, of from about 1.2 mm to about 1.5 mm.

Figure 5:
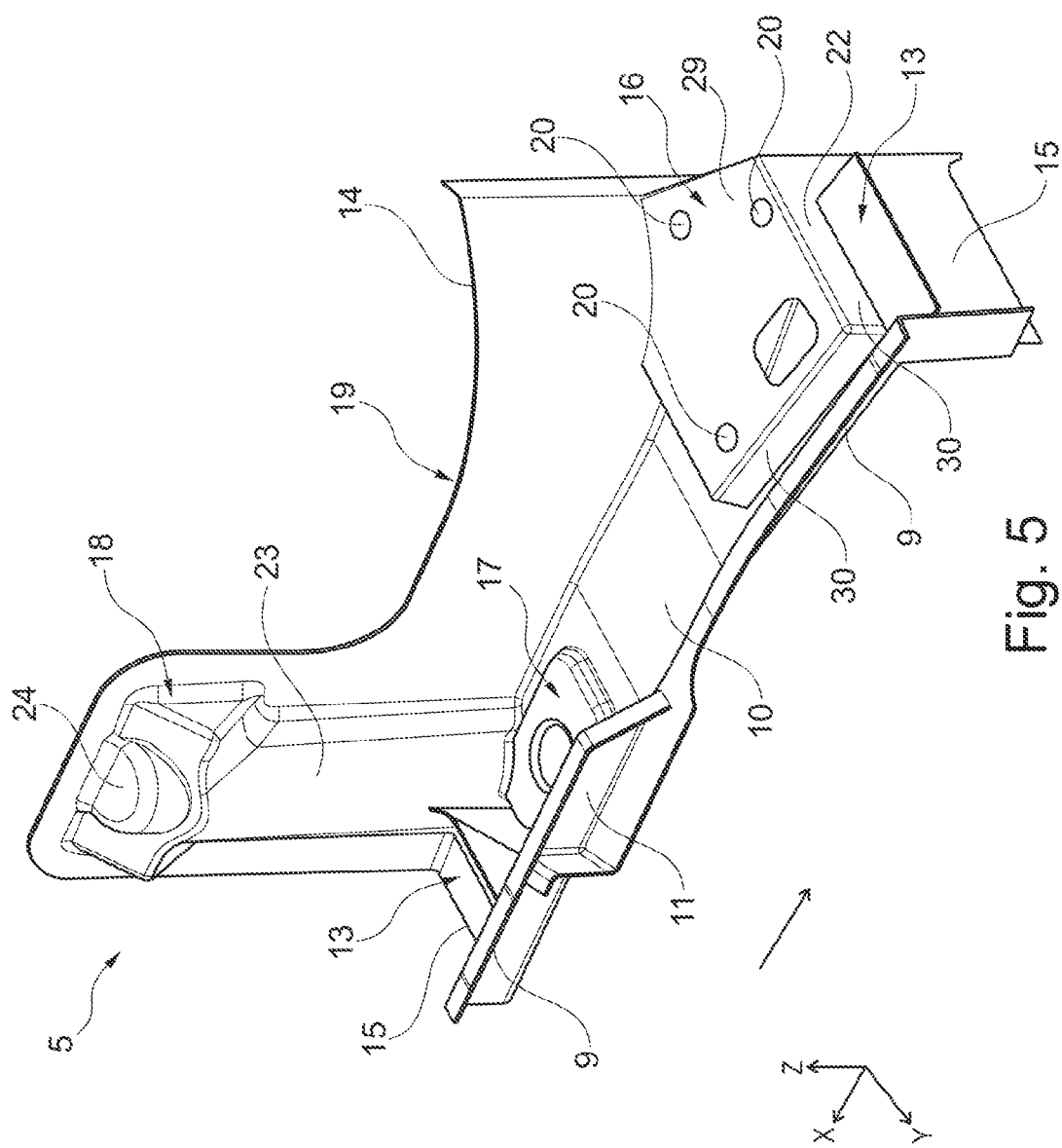
FIGS. 5-6 are schematic perspective representations of the middle shell part of the lower shell from FIG. 2.
Figure 6:
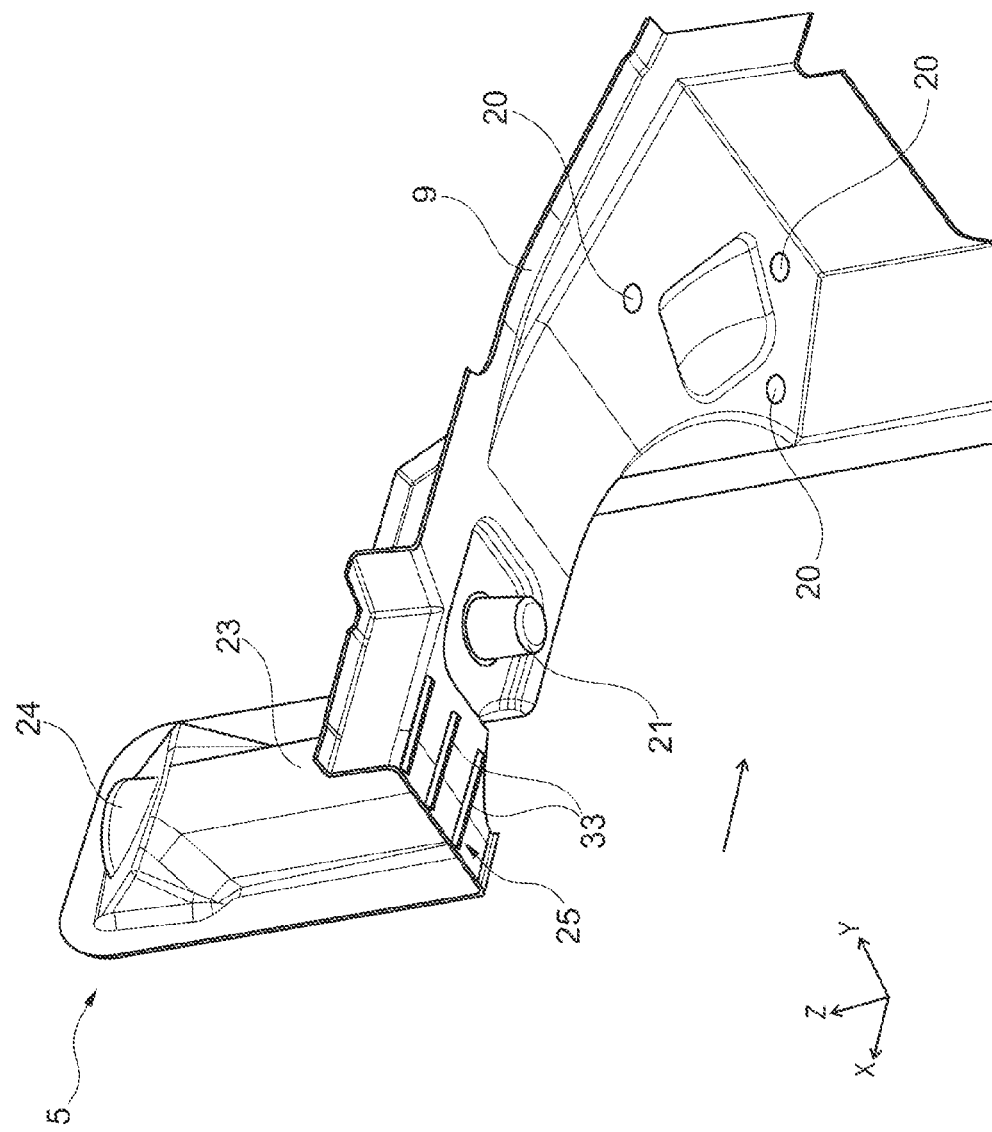

In the FIGS. 5 and 6, the middle shell part 5 is shown enlarged in schematic perspective representations in a view from the top front (FIG. 5) and bottom rear (FIG. 6).

Accordingly, in an embodiment, the middle shell part 5 has a U-shape with different-length legs and comprises a floor portion 10, which merges into an inner wall portion 11 and an outer wall portion 14, each of which extend towards the top, wherein the outer wall portion 14 clearly protrudes over the inner wall portion 11. A folded-over edge of the inner wall portion 11 serves as lower shell flange 9 for fastening the upper shell 3. On its two face ends 15, the middle shell part 5 comprises a first connecting region 13 each, wherein, based on the driving direction (−x), the front first connecting region 13 serves for connecting the middle shell part 5 to the front shell part 4 and the rear first connecting region 13 for connecting the middle shell part 5 to the rear shell part 6.

The middle shell part 5 is produced as one-piece thin cast component according to the casting method. In an embodiment, it consists of sheet steel having a yield strength in the range of from about 800 to about 1,000 MPa. The wall thickness of the middle shell part 5 at each point amounts to a maximum of about 2.5 mm and is in the range of from about 1.5 mm to about 2.5 mm.

A plurality of connecting regions for connecting non-body vehicle components is molded into the middle shell part 5 in an integrated manner, in accordance with an embodiment. The connecting regions can be formed in a simple and cost-effective manner by casting the middle shell part 5, so that a separate assembly to the middle shell part 5 is not required.

Figure 11:
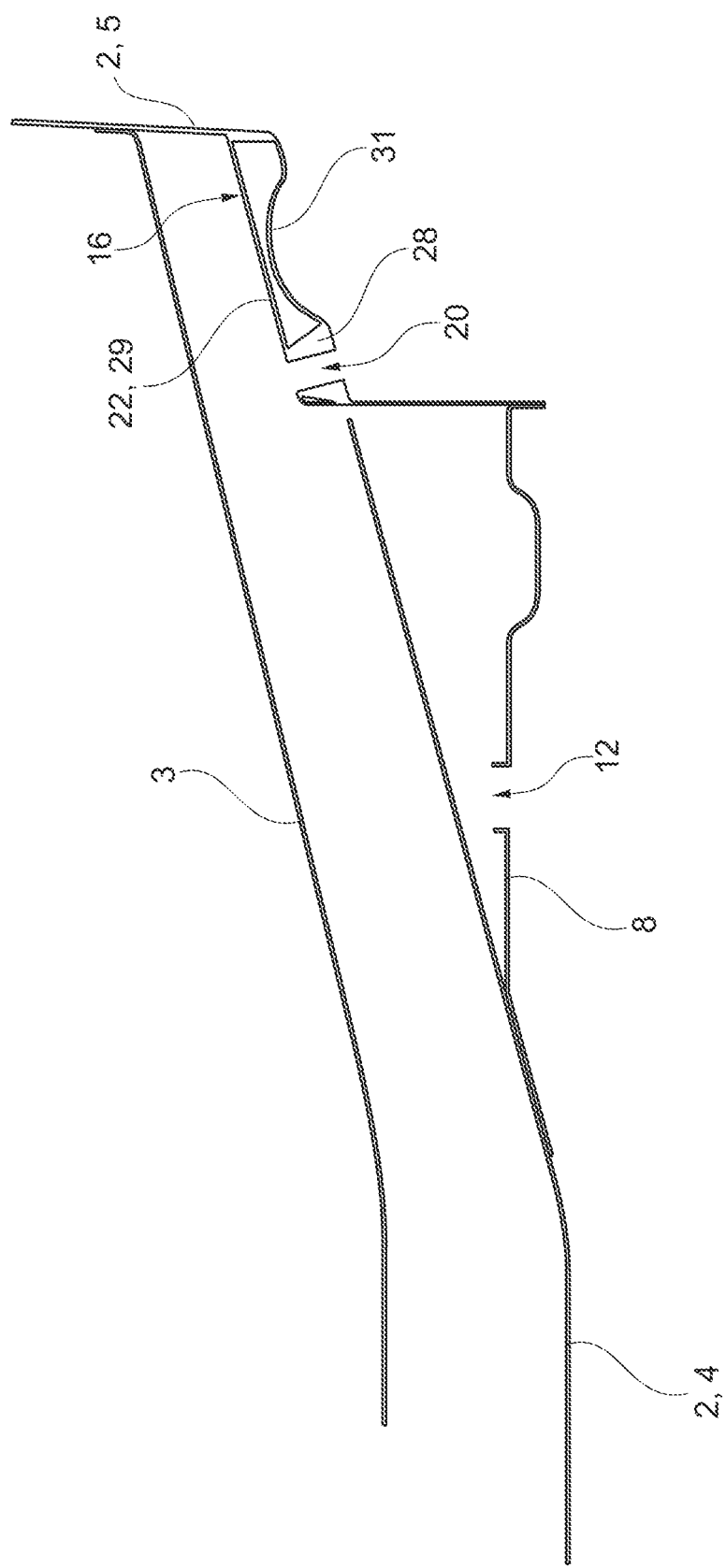

Thus, in an embodiment, a second connecting region 16 is formed on the middle shell part 5, which serves for fastening an axle swingarm (not shown) for a wheel suspension of the left rear vehicle wheel. As is evident in FIG. 5, the second connecting region 16 comprises a box-shaped hollow profile 22 arranged on the top side of the floor portion 10, which comprises an approximately horizontal upper cover plate 29, vertical side plates 30 and a lower floor plate 31. The floor plate 31 is evident in the sectional view from FIG. 11 explained in more detail further down below. The box-shaped hollow profile 22 comprises a plurality of screw holes 20 for screwing-on the axle swingarm. Here, a dome 28 noticeable in FIG. 11 is formed for each screw hole 20, through which a spacing of a weld nut (not shown) fitted to the cover plate 29 from the associated screwing-on point of the axle swingarm is achieved. Through this spacing with a length of approximately 20 to approximately 30 mm, the stiffness of the screw fastening can be increased.

In the middle shell part 5, a third connecting region 17 is molded in an integrated manner adjacently to the rear face end 15, which is formed as protrusion of the floor portion 10 directed towards the top. In the middle of the third connecting region 17 a truncated cone-shaped pin 28 projecting downwards is located, which serves for the one sided fixing of an axle spring (which is not shown) of the wheel suspension of the left rear vehicle wheel. In installation position, the axle spring is located below the middle shell part 5.

Figure 10:
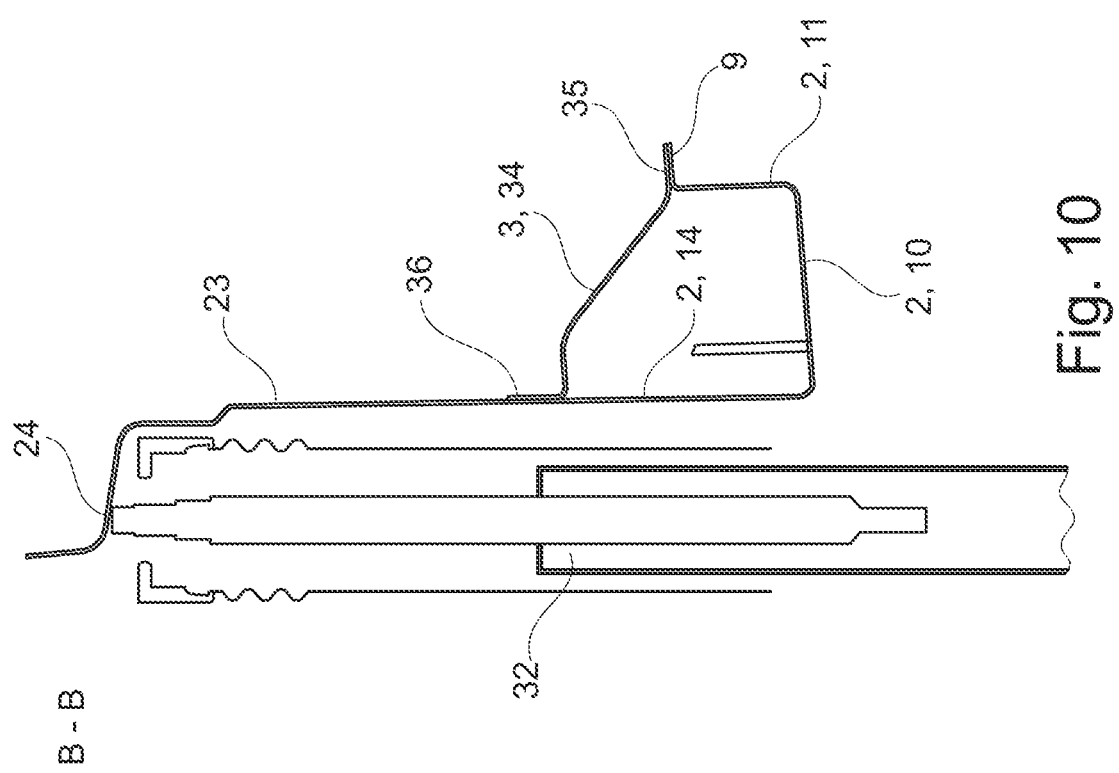

Furthermore, a fourth connecting region 18 is molded into the outer wall portion 14, which comprises a channel-shaped shock absorber recess 23, which towards the top opens into a shock absorber mounting 24 for fixing the upper end of a shock absorber 32 shown in FIG. 10.

The outer wall portion 14 furthermore comprises a fifth connecting region 19, which serves for fastening a wheel housing (not shown) of the left rear vehicle wheel.

As is evident in FIG. 6, in an embodiment, a rib structure 25 with a plurality of ribs 33 is formed in an integrated form on the rear first connecting region 13 of the middle shell part 5 of the lower shell 2. Through this rib structure 25, an improvement of the stiffness and a better or optimized load introduction upon a rear-end collision, in particular with respect to the different material qualities of the materials of the middle shell part 5 and of the rear shell part 6, is achieved.

Figure 7:
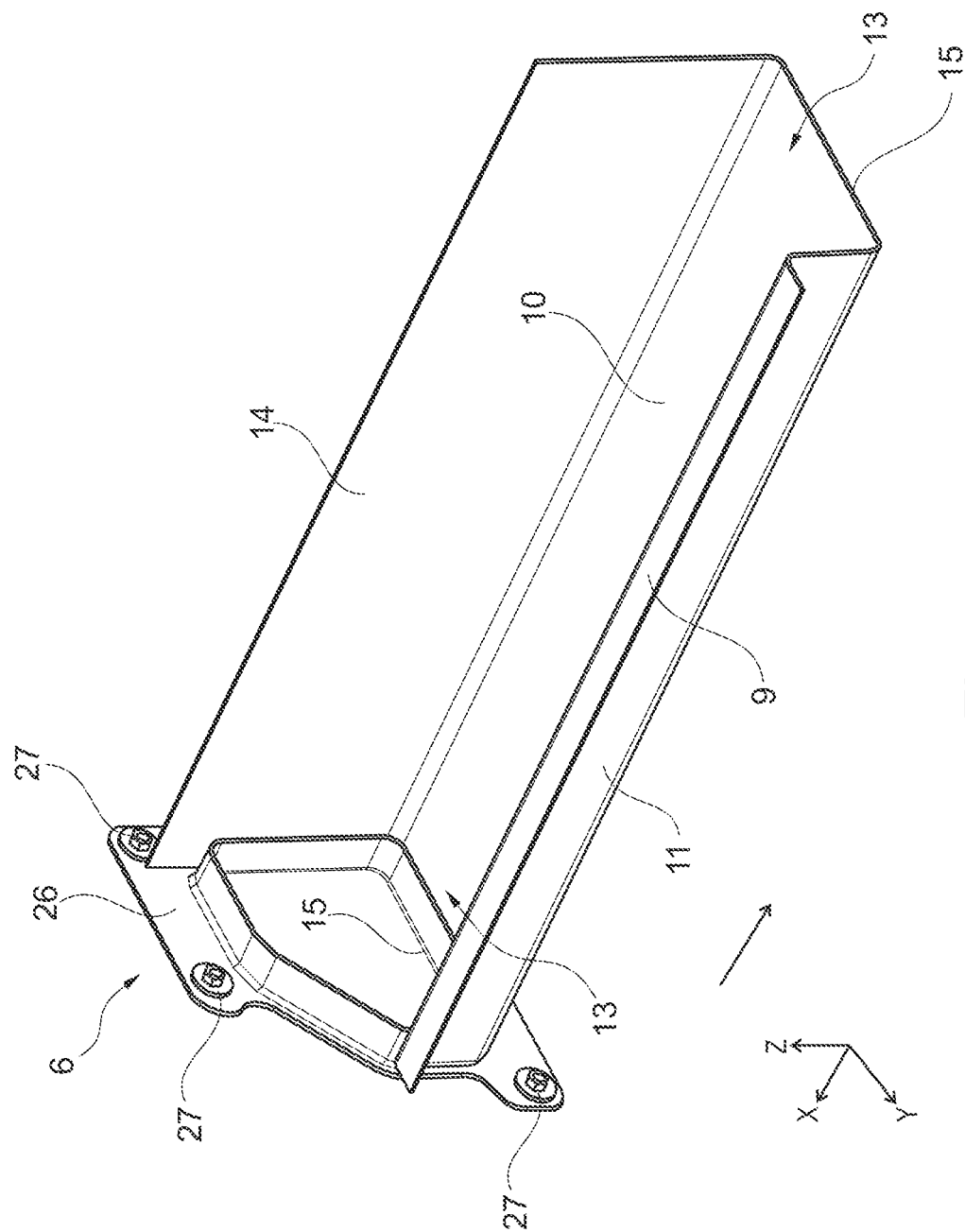
FIG. 7 is a schematic perspective representation of the rear shell part of the lower shell from FIG. 1.

FIG. 7 shows the rear shell part 6 in an enlarged schematic perspective representation in a view from the top front.

Accordingly, in an embodiment, the rear shell part 6 has a U-shape and comprises a horizontal floor portion 10, which merges into a vertical inner wall portion 11 and a vertical outer wall portion 14, wherein the outer wall portion 14 clearly protrudes over the inner wall portion 11. On the front face end 15 is located a front first connecting region 13 for fastening to the middle shell part 5. On the rear face end 15 is located a rear first connecting region 13, to which an anchor plate 26 for the releasable fastening of a bumper cross member (not shown) by means of weld nuts 27 is attached through a conventional fastening technique such as welding, riveting, clinching or gluing.

The rear shell part 6 is produced as a roll-formed component according to the roll forming method. It consists of sheet steel having a yield strength in the range of from about 800 to about 1,100 MPa. Preferentially, it consists of sheet steel having a yield strength above 1,000 MPa. The wall thickness of the rear shell part 6 is in the range from about 1.2 mm to about 1.8 mm.

In the lower shell 2 of the lower side member 1 shown assembled in FIG. 2, the shell parts 4-6 are each connected to one another in a fixed manner at the face ends 15. The first connecting regions 13 of the adjoining shell parts provided for connecting are designed in fitted form for this purpose and possess a certain overlap, on which the fastening points 7 are located.

Figure 8:
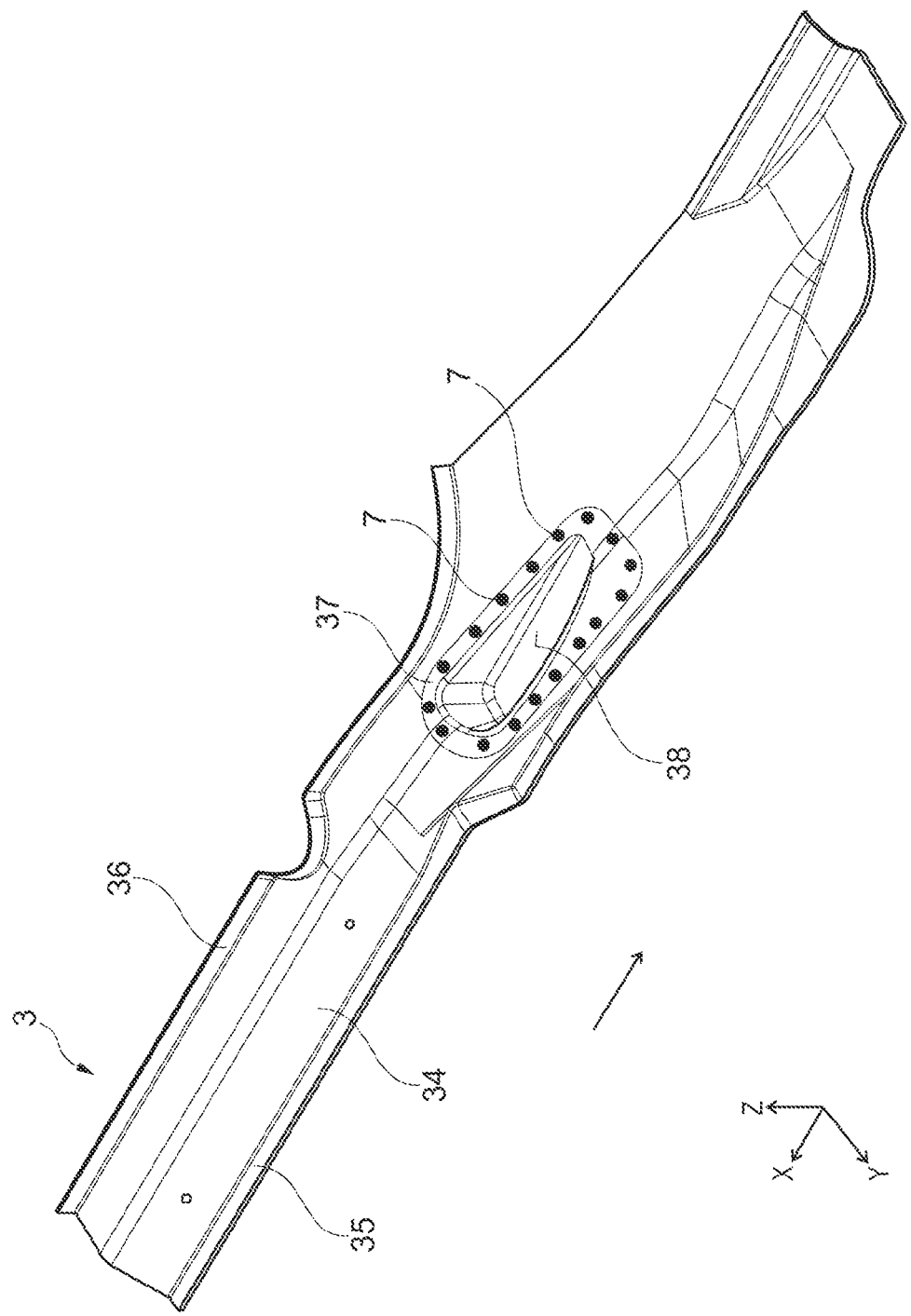
FIG. 8 is a schematic perspective representation of the upper shell of the side member from FIG. 1.

In FIG. 8, in an embodiment, the upper shell 3 is shown in a view from the top front by means of a schematic perspective representation. The upper shell 3 is produced as one-piece deep-drawn component from a hot-formable sheet steel having a yield strength of more than about 1,200 MPa. Thus, the upper shell 3 comprises a cover portion 34 which merges into an inner upper shell flange 35 and an outer upper shell flange 36 for fastening the lower shell 2. In a front half of the upper shell 3, an insert part 37 is inserted in a recess of the upper shell and fastened through a plurality of fastening points 7. A conventional fastening technique such as welding, riveting, clinching or gluing can be employed for this purpose. The insert part 37 serves for fastening a vehicle seat (not shown). To this end, the insert part 37 comprises a horizontal connecting surface 38.

In the case of an alternative configuration of the upper shell 3, which is not shown in the Figures, the upper shell 3 is assembled from two shell parts, which are arranged one after the other in extension direction. This relates to a front shell part comprising the insert part 37 and which is designed as a deep-drawn component in particular from a metal material having a yield strength of more than about 1,200 MPa, and to a rear shell part, which is designed as a roll-formed component in particular from a metal material having a yield strength of more than about 1,000 MPa. Such a two-piece construction of the upper shell makes possible an adaptation of the material characteristics of the two shell parts to the loads that occur in practice, so that material costs can be saved.

In the assembly of the side member 1 shown in FIG. 1, the inner upper shell flange 35 is connected in a fixed manner to the lower shell flange 9, which are both rendered in a horizontally opposing position. Here, the inner upper shell flange 35 extends as far as to the front end of the upper shell 3. In addition, the outer upper shell flange 36 is connected in a fixed manner to the outer wall portion 14 of the rear as well as middle shell parts 6, 5, each of which are rendered in a vertically opposing position. A connection of the flanges is effected through a conventional fastening technique such as welding, riveting, clinching or gluing. Lower and upper shells 2, 3 form a closed hollow profile in the region of the rear and middle shell part 6, 5. In the region of the front shell part 4, the side member 1 is open towards the vehicle outside. There, the side member is connected to the left side sill (not shown) in the installed state, wherein the side sill complements the side member 1 to a closed hollow profile.

Figure 9:
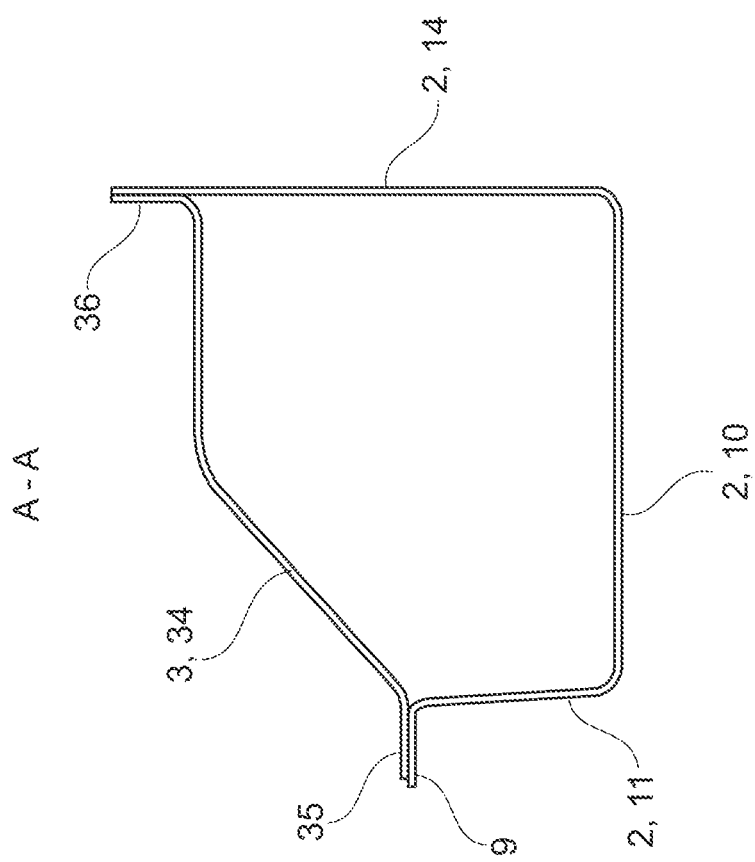
FIGS. 9-11 are sections through the side member from FIG. 1. according to section line A-A (FIG. 9), section line B-B (FIG. 10), and section line C-C (FIG. 11).

In the cross-sectional representation of FIG. 9, which corresponds to the section A-A from FIG. 1, the rear shell part 6 of the lower shell 2, the upper shell 3 and its connection to the flanges are evident. The same applies correspondingly to the cross-sectional representation of FIG. 10, which corresponds to section B-B from FIG. 1, wherein the middle shell part 5 of the lower shell 2, the upper shell 3 and its connection to the flanges is evident. In addition, FIG. 10 shows the shock absorber recess 23, the absorber mounting 24 and the shock absorber 32. In the longitudinal sectional representation from FIG. 11, which corresponds to the section C-C from FIG. 1, the front shell part 4 of the lower shell 2 and the upper shell 3 are evident. In addition, FIG. 11 shows the second connecting region 16 for connecting the axle swingarm to the box-shaped hollow profile 22 designed as hollow profile. Furthermore, the stiffening profile 8 with the main mounting holes 12 fastened to the lower side of the front shell part 4 are evident.

The embodiments make available an improved side member in shell design for the rear frame of a self-supporting body for a motor vehicle, in which the lower shell is assembled from three shell parts, wherein the middle shell part is designed as thin cast component and comprises a plurality of integrated connecting regions. The front shell part is produced from a sheet steel of lesser quality according to the deep-drawing method, the rear shell part according to the roll-forming method from a sheet steel of higher quality. The side member thus advantageously makes possible a reduction of the vehicle weight, a reduced number of parts, a simplified assembly, a reduction of the assembly tolerances, a reduction of the material and production costs, and an improvement of the stiffness and load introduction in the event of a rear-end collision.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A side member in shell configuration for a rear frame of a self-supporting body of a motor vehicle, the side member comprising:
    a lower shell having three shell parts that, in an extension direction of the side member, are arranged one after the other, wherein a middle shell part of the three shell parts is arranged at least in portions between the other two of the three shell parts and is configured as a metal cast component, wherein the middle shell part comprises: an outer wall portion that includes a shock absorber mounting having a shock absorber recess configured to receive a shock absorber; and
    an upper shell connected to the lower shell in a fixed manner and at least in portions forms a closed hollow member with the lower shell.

2. The side member according to claim 1, wherein the middle shell part is configured as a steel cast component.

3. The side member according to claim 1, wherein the middle shell part has a maximum wall thickness of about 2.5 mm.

4. The side member according to claim 3, wherein the middle shell part has the maximum wall thickness in the range of from about 1.5 mm to about 2.5 mm.

5. The side member according to claim 1, wherein the middle shell part comprises an integrated connecting region for connecting non-body vehicle parts.

6. The side member according to claim 5, wherein the middle shell part comprises a connecting region for connecting an axle swingarm, wherein the connecting region is configured as a box-shaped hollow profile.

7. The side member according to claim 1, wherein a front shell part of the three shell parts is arranged at a front of the middle shell part and is formed as a deep-drawn component.

8. The side member according to claim 7, wherein the front shell part comprises a metal material.

9. The side member according to claim 7, wherein the front shell part comprises sheet steel having a yield strength in the range of from about 600 to about 800 MPa.

10. The side member according to claim 1, wherein a rear shell part of the three shell parts is arranged at a rear end of the middle shell part and is configured as a roll-formed component.

11. The side member according to claim 10, wherein the rear shell part comprises sheet steel having a yield strength of more than about 1,000 MPa.

12. The side member according to claim 1, wherein the upper shell is configured as a one-piece deep-drawn component.

13. The side member according to claim 12, wherein the upper shell comprises a hot-formable metal material.

14. The side member according to claim 13, wherein the upper shell comprises sheet steel having a yield strength of more than about 1,200 MPa.

15. The side member according to claim 12, wherein the upper shell comprises an insert part for connecting a vehicle seat.

16. The side member according to claim 1, wherein the upper shell an insert part for connecting a vehicle seat, wherein the upper shell comprises two shell parts which, in the extension direction of the side member, are arranged one after the other, wherein a front shell part of the upper shell at a front end in an installed state comprises the insert part and is configured as a deep-drawn component, and wherein a rear shell part of the upper shell at a rear end in the installed state is configured as a roll-formed component.

17. The side member according to claim 1, wherein on a lower side of a front shell part of the three shell parts a stiffening profile comprising a hole for an engagement of a tool during an assembly of the self-supporting body of the motor vehicle is attached.

18. A rear frame of a motor vehicle with a self-supporting body, the rear frame having on both sides of a center longitudinal axis a side member comprising:
    a lower shell having three shell parts that, in an extension direction of the side member, are arranged one after the other, wherein a middle shell part of the three shell parts is arranged at least in portions between the other two of the three shell parts and is configured as a metal cast component, wherein the middle shell part comprises: an outer wall portion that includes a shock absorber mounting having a shock absorber recess configured to receive a shock absorber; and an upper shell connected to the lower shell in a fixed manner and at least in portions forms a closed hollow member with the lower shell.

19. A motor vehicle having a self-supporting body with a rear frame having on both sides of a center longitudinal axis a side member comprising:
a lower shell having three shell parts that, in an extension direction of the side member, are arranged one after the other, wherein a middle shell part of the three shell parts is arranged at least in portions between the other two of the three shell parts and is configured as a metal cast component, wherein the middle shell part comprises: an outer wall portion that includes a shock absorber mounting having a shock absorber recess configured to receive a shock absorber; and
an upper shell connected to the lower shell in a fixed manner and at least in portions forms a closed hollow member with the lower shell.

20. The side member according to claim 1, wherein the middle shell part further comprises:
an inner wall portion; and
a floor portion that couples the outer wall portion to the inner wall portion such that the outer wall portion, the floor portion and the inner wall portion define a U-shape cross section.

21. The side member according to claim 20, wherein the floor portion comprises:
a connecting region configured to receive a pin.

22. The side member according to claim 20, wherein the middle shell part comprises:
a connecting region for connecting an axle swingarm, wherein the connecting region is configured as a box-shaped hollow profile; and
wherein the connecting region is integral with the floor portion that couples the outer wall portion to an inner wall portion.

23. The rear frame according to claim 18, wherein the middle shell part further comprises:
an inner wall portion; and
a floor portion that couples the outer wall portion to the inner wall portion such that the outer wall portion, the floor portion and the inner wall portion define a U-shape cross section.

24. The rear frame according to claim 23, wherein the floor portion comprises:
a connecting region configured to receive a pin.

25. The rear frame according to claim 23, wherein the middle shell part comprises:
a connecting region for connecting an axle swingarm, wherein the connecting region is configured as a box-shaped hollow profile; and
wherein the connecting region is integral with the floor portion that couples the outer wall portion to an inner wall portion.

26. The motor vehicle according to claim 19, wherein the middle shell part further comprises:
an inner wall portion; and
a floor portion that couples the outer wall portion to the inner wall portion such that the outer wall portion, the floor portion and the inner wall portion define a U-shape cross section.

27. The motor vehicle according to claim 26, wherein the floor portion comprises:
a connecting region configured to receive a pin.

28. The motor vehicle according to claim 26, wherein the middle shell part comprises:
a connecting region for connecting an axle swingarm, wherein the connecting region is configured as a box-shaped hollow profile; and
wherein the connecting region is integral with the floor portion that couples the outer wall portion to an inner wall portion.

* * * * *